United States Patent
Sakai

[19]

[11] Patent Number: 6,034,514

[45] Date of Patent: *Mar. 7, 2000

[54] SWITCHING REGULATOR

[75] Inventor: Setsuo Sakai, Amagasaki, Japan

[73] Assignee: Nihon Protector Co., Ltd., Amagasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/186,659

[22] Filed: Nov. 6, 1998

[30] Foreign Application Priority Data

Jan. 12, 1998 [JP] Japan .................................. 10-003615

[51] Int. Cl.⁷ ...................................................... H02M 7/00
[52] U.S. Cl. ............................ 323/225; 323/222; 323/272
[58] Field of Search ..................................... 323/222, 223, 323/225, 268, 271, 272, 282, 284, 292

[56] References Cited

U.S. PATENT DOCUMENTS

| | | | |
|---|---|---|---|
| 4,725,768 | 2/1988 | Watanabe | 323/222 |
| 5,278,489 | 1/1994 | Bowers | 323/225 |
| 5,677,617 | 10/1997 | Tokai et al. | 323/222 |

*Primary Examiner*—Jessica Han
*Attorney, Agent, or Firm*—Armstrong, Westerman, Hattori, McLeland & Naughton

[57] ABSTRACT

A switching regulator includes: a boost chopper circuit A including a plurality of inductances 2, 3, 4 and 5 which are connected in parallel with a D.C. power supply 1 for boosting the D.C. power supply 1, a plurality of commutating diodes 6, 7, 8 and 9 which are connected to output sides of those inductances 2, 3, 4 and 5, respectively, a plurality of switching elements 10, 11, 12 and 13 for connecting the D.C. power supply 1 and nodes between the respective inductances 2 to 5 and the respective diodes 6 to 9 in a short-circuiting manner, and a smoothing capacitor 14 connected in series to a combined output section of those diodes 6 to 9; a control circuit 15 for controlling the on/off operation of those switching elements 10 to 13; and a load 16 connected in parallel with the smoothing capacitor 14. The plurality of switching elements 10 to 13 repeatedly operate while the operation of the plurality of switching elements 10 to 13 is sequentially delayed by a predetermined period of time.

5 Claims, 8 Drawing Sheets

PRIOR ART

Fig. 8

PRIOR ART

Fig. 9 PRIOR ART

SWITCHING REGULATOR

BACKGROUND OF THE INVENTION

1. Field of the Invention

The present invention relates to a switching regulator used as power supply for an inverter circuit for driving a electric motor by boosting a low voltage (24 V, 48 V, etc.) of a battery mounted on an electric vehicle, as a power supply of a solar cell for high output, or for completely consuming an energy of a super capacitor or the like.

2. Description of the Related Art

Figure 7:
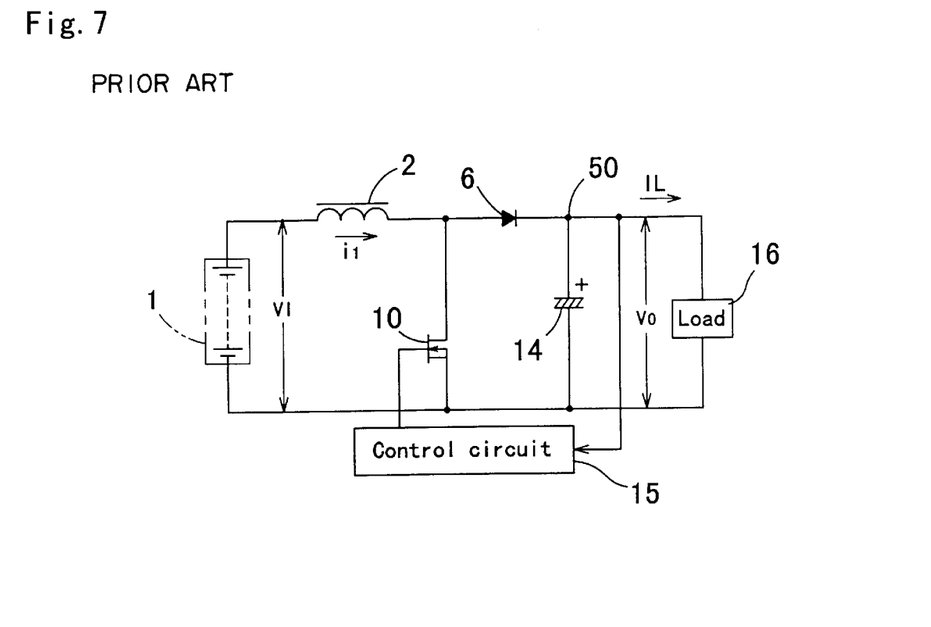
FIG. 7 is a circuit diagram showing a first conventional specific structure of the switching regulator.
Figure 8:
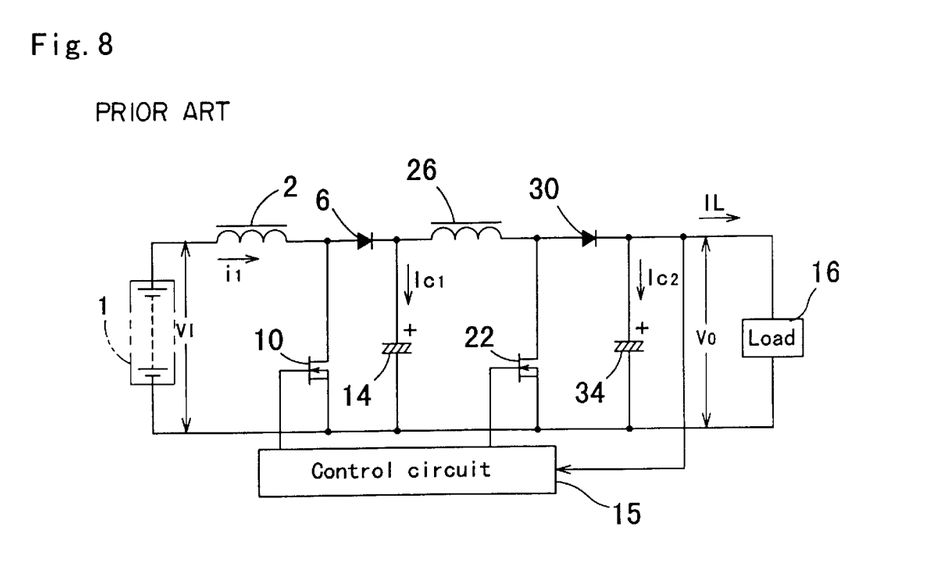
FIG. 8 is a circuit diagram showing a second conventional specific structure of the switching regulator.
Figure 9:
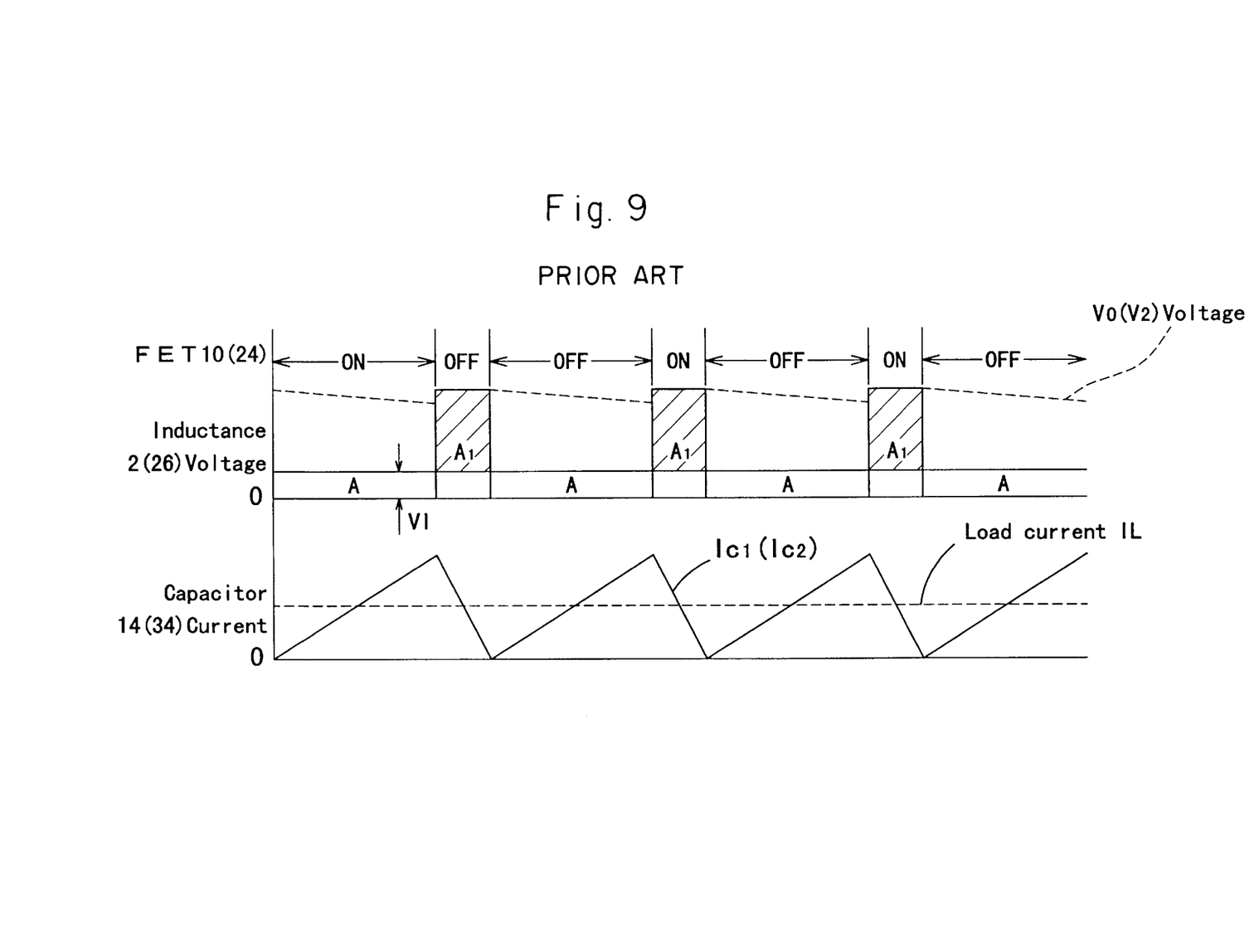
FIG. 9 is a graph showing an energy stored in inductances and a current flowing in a smoothing capacitor.

Up to now, there is one type of switching regulators for obtaining an output voltage higher than that of an input voltage, which is made up of a boost chopper circuit, for example, as shown in FIGS. 7 and 8.

In FIG. 7, an inductance 2 is connected in series to a plus side of a D.C. power supply 1, an anode side of a diode 6 is connected to an output side of the inductance 2, and a cathode side of the diode 6 is connected to a node 50 at which the smoothing capacitor 14 and a load 16 are connected in parallel. Then, in order to hold a voltage across the load 16 constant, there is provided a control circuit 15 for controlling the on/off operation of a switching element (FET) 10 that short-circuits a node between the inductance 2 and the diode 6 and a minus side of the D.C. power supply 1.

The control circuit 15 operates so that in an on-state of the switching element (FET) 10, the load 16 is driven by a voltage VI of the D.C. power supply 1 while a magnetic energy is stored in the inductance 2. Then, when the switching element (FET) 10 becomes in an off-state, the magnetic energy stored in the inductance 2 and the voltage VI of the D.C. power supply 1 are superimposed on each other to drive the load 16.

FIG. 8 shows a circuit structure in which a circuit consisting of an inductance 26, a diode 30, a switching element (FET) 22 and a smoothing capacitor 34 which is identical in structure with the circuit of FIG. 7 is connected in series to the circuit of FIG. 7. In the figure, when the switching elements (FETs) 10 and 22 are in the on-state, the load 16 is driven by the voltage VI of the D.C. power supply 1 while a magnetic energy is stored in the inductances 2 and 26. Then, when the switching elements (FETs) 10 and 22 become in the off-state, the magnetic energy stored in the inductances 2 and 26 and the voltage VI of the D.C. power supply 1 are superimposed on each other to drive the load 16.

In both of the above two circuits shown in FIGS. 7 and 8, because a current $I_{c1}$ or $I_{c2}$ flowing in the capacitor 14 or 34 becomes a large triangular-wave ripple current, a current of several tens amperes or more flows in the capacitor 14 or 34 particularly when the load 16 is large in capacitance (1 kW or more), to thereby make the heating of the smoothing capacitors 14 and 34 high. As a result, there are disadvantageous in that not only the smooth capacitors must be made larger in size but also the lifetime becomes shorter.

Also, when the switching elements (FETs) 10 and 22 are in the on-state, that is, when the magnetic energy is stored in the inductances 2 and 26, the output voltage is equal in value to the input voltage VI. Therefore, a discharge energy from the smoothing capacitors is relied on in order to obtain a large output voltage, and large-scaled smoothing capacitors are required. This causes not only that the above disadvantages are made remarkable but also that in the case where the energy consumption of the load is particularly large, the magnetic energy stored in the inductances 2 and 26 is completely discharged, to thereby disable the load to be continuously driven. Thus, there is room for improvement.

SUMMARY OF THE INVENTION

The present invention has been made in order to solve the above problems, and therefore an object of the present invention is to provide a switching regulator which is capable of supplying a large output while preventing a smoothing capacitor from being increased in size, and also which is capable of preventing a short lifetime and continuously driving a load.

In order to achieve the above object, according to the present invention, there is provided a switching regulator, comprising: a boost chopper circuit including a plurality of inductances connected in parallel with a D.C. power supply for boosting the D.C. power supply; a plurality of commutating diodes connected to output sides of said inductances, respectively, a plurality of switching elements for connecting said D.C. power supply and a node between each of said inductances and each of said diodes in a short-circuiting manner, and a smoothing capacitor connected in series to a combined output section of said plurality of diodes; a control circuit for controlling the on/off operation of said plurality of switching elements; and a load connected in parallel with said smoothing capacitor; wherein said plurality of switching elements repeatedly operate while the operation of said plurality of switching elements is sequentially delayed by a predetermined period of time.

Because the plurality of switching elements repeatedly operate while the operation of the plurality of switching elements is sequentially delayed by a predetermined period of time, a large output (energy) can be obtained in comparison with a switching regulator in which energies stored in other inductances not corresponding to a specific switching element when the specific switching element is in an on-state are sequentially outputted by switching the specific switching element from the on-state to an off-state to boost an output voltage by a single switching element. Also, a current flowing in the smoothing capacitor can be smoothed, and even in the case where an energy consumption of the load is particularly large, the load can be continuously driven by adjusting the on/off period of the switching element. A larger output (energy) can be obtained as the number of inductances increases.

The above control circuit comprises a PWM control circuit that controls the on-period of the plurality of switching elements in order to hold avoltage value of the load constant. Alternatively, a micro-computer or the like may be employed for control.

With an arrangement in which the respective inductances are made up of insulating flyback transformers each consisting of a primary winding and a secondary winding, if the number of turns of the primary winding and the number of turns of the secondary winding are altered, the output voltage can be not only boosted but also dropped with respect to the input voltage.

Because a plurality of boost chopper circuits structured as described above are connected in series, and all of the switching elements of those boost chopper circuits are connected to a single control circuit so as to be on/off-controlled, a large output (energy) can be obtained in comparison with a switching regulator in which a single boost chopper circuit is driven. Moreover, if all of the switching elements are on/off-controlled by a single control circuit, the circuit can be simplified.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

Figure 1:
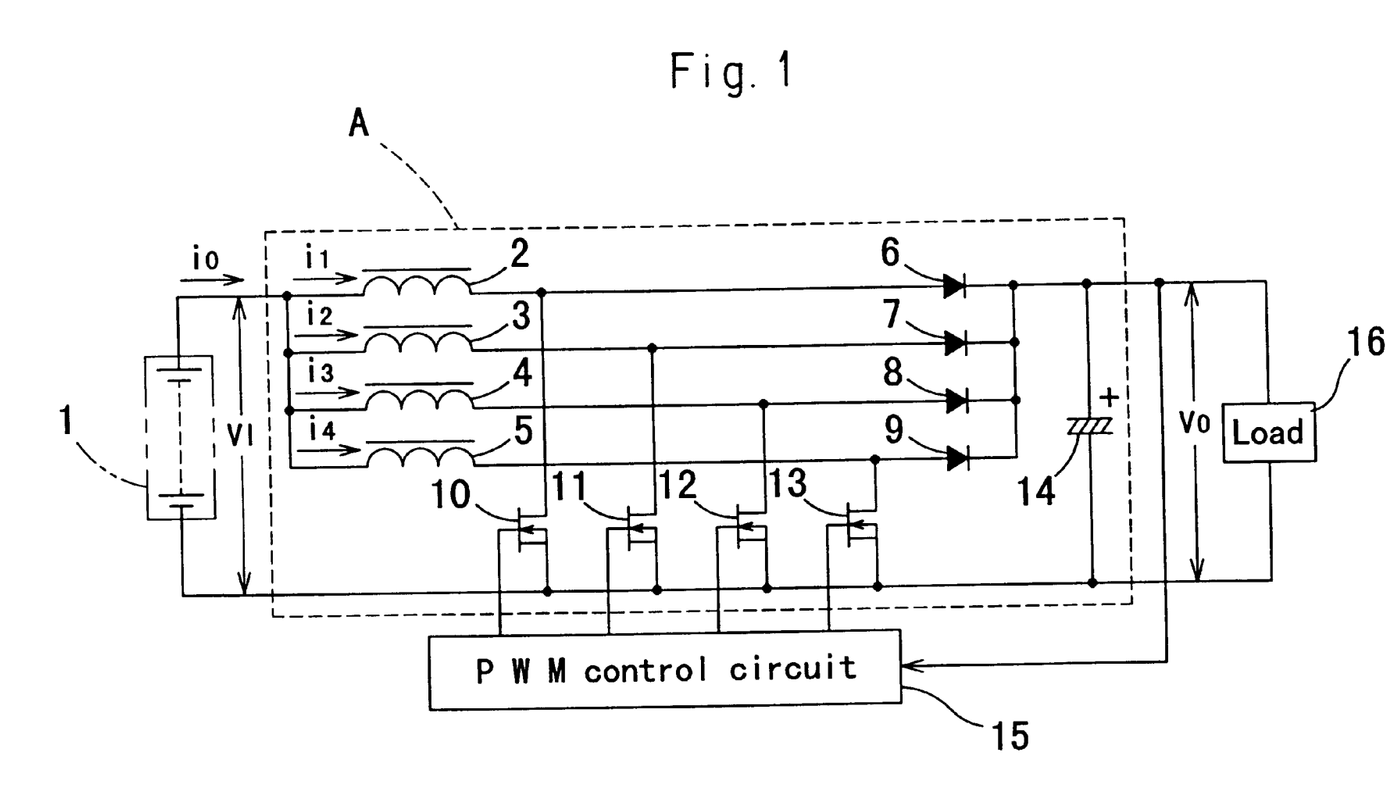
FIG. 1 is a circuit diagram showing a first specific structure of a switching regulator.

FIG. 1 shows a switching regulator according to the present invention.

The switching regulator, as shown in FIG. 1, includes: a boost chopper circuit A including four inductances 2, 3, 4 and 5 which are connected in parallel with a D.C. power supply 1 for boosting the D.C. power supply 1, four commutating diodes 6, 7, 8 and 9 which are connected to output sides of those inductances 2, 3, 4 and 5, respectively, four field effect transistors 10, 11, 12 and 13 (hereinafter referred to as "FETs") serving as switching elements for connecting the D.C. power supply 1 and nodes between the respective inductances 2 to 5 and the respective diodes 6 to 9 in a short-circuiting manner, and a smoothing capacitor 14 connected in series to a combined output section of those four diodes 6 to 9; a control circuit 15 for controlling the on/off operation of those four FETs 10 to 13; and a load 16 connected in parallel with the smoothing capacitor 14. The number of the inductances may be two, three, five or more for implementation. The number of switching elements is altered in correspondence with the number of inductances. The switching elements may be formed of various elements such as transistors or insulated gate bipolar mode transistors (IGBTs) other than FETs.

The control circuit 15 is designed to control the on/off operation of the four FETs 10 to 13 on the basis of a variation in the terminal voltage of the load 16, and specifically formed of a PWM control circuit that holds a frequency constant and controls the on-period (pulse width) of the FETs 10 to 13, to thereby hold an output voltage constant. In other words, in the case where a voltage across the load 16 becomes lower than a predetermined voltage, the on-periods of the FETs 10 to 13 are lengthened so as to obtain a large output voltage. On the contrary, in the case where the voltage across the load 16 becomes higher than the predetermined voltage, the on-periods of the FETs 10 to 13 are shortened so as to obtain a small output voltage. As a result, the output voltage can be always held constant regardless of a fluctuation of the voltage across the load 16. The four inductances 2 to 5 are repeatedly operated while the operation of the four inductances 2 to 5 is sequentially delayed by a predetermined period of time so that magnetic energies stored in the inductances 2 to 5 are superimposed on an input voltage VI to drive the load 16. As a result, not only a ripple current can be prevented from occurring but also an output can be remarkably improved. In addition, the smoothing capacitor 14 small in capacitance can be employed.

Figure 4:
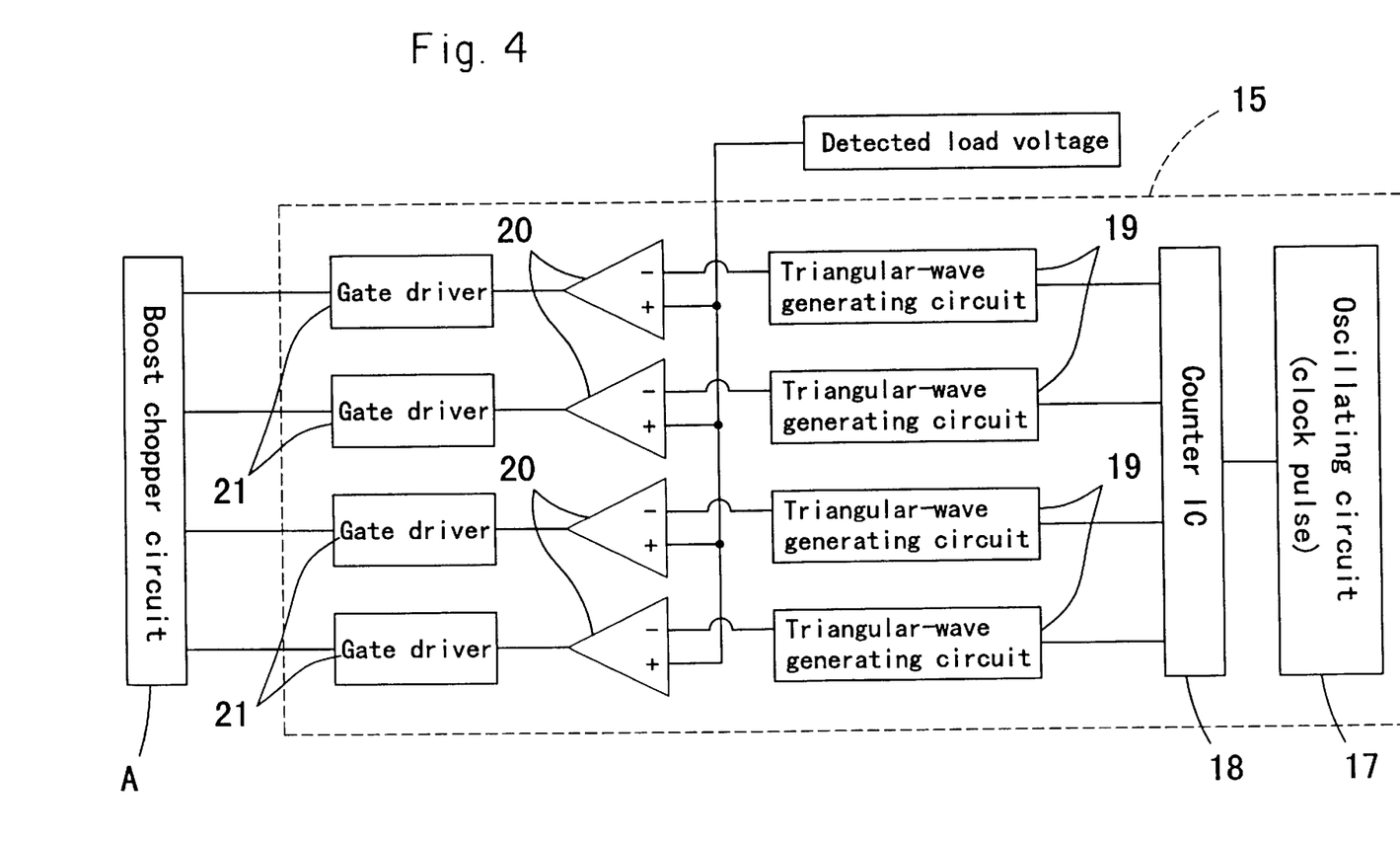
FIG. 4 is a circuit diagram showing a specific structure of a PWM control circuit.

The PWM control circuit 15 is made up of, as shown in FIG. 4, an oscillating circuit 17 for generating clock pulses, a counter 18 for counting the clock pulses from the oscillating circuit 17, a plurality of triangular-wave generating circuits 19 for appropriately generating triangular waves according to information from the counter 18, a plurality of differential amplifiers 20 for comparing voltages from those triangular-wave generating circuits 19 with a detected output voltage (a detected load voltage) to generate outputs, and gate drivers 21 for driving the gates of the FETs 10 to 13 according to outputs from those differential amplifiers 20. The PWM control circuit 15 is not limited to the above structure, but the on-period (pulse width) of the FETs 10 to 13 may be controlled by a micro-computer.

The operation of the switching regulator thus structured will be described. As shown in FIG. 3, when a clock pulse of the predetermined number (a first pulse) among clock pulses generated from the oscillating circuit 17 rises, a voltage is applied to the gate of the FET 10 to make the FET 10 in an on-state. In this situation, the D.C. current I allows a current $i_1$, that is, a current indicated by a triangular-wave current A for exciting the inductance 2 shown in FIG. 2 to flow. At the same time, the application of a voltage to the gate of the FET 11 which is in the on-state is interrupted to make the FET 11 in an off-state. In this situation, a voltage $B_1$, shown in FIG. 3 is moved to the smoothing capacitor 14 in a forward direction of the diode 7 with a magnetic energy stored in the inductance 3 as a flyback voltage. A current flowing in this situation is indicated by $B_1$ in FIG. 2. A relation that an area of an energy B stored in the inductance 3 is identical with an area of an energy $B_1$ discharged as the flyback voltage is satisfied, and the respective relationships between A and $A_1$, C and $C_1$, and D and $D_1$ generated by the FETs 10, 12 and 13 which will be described later are also identical with the above relationship in theory. Then, in the figure, when a second clock pulse rises, a voltage is applied to the gate of the FET 11 that gets in the off-state to make the FET 11 in the on-state. In this situation, the D.C. current I allows a current $i_2$, that is, a current indicated by a triangular-wave current B for exciting the inductance 3 shown in FIG. 2 to flow. At the same time, the application of a voltage to the gate of the FET 12 which is in the on-state is interrupted to make the FET 12 in the off-state. In this situation, a voltage $C_1$ shown in FIG. 3 is moved to the smoothing capacitor 14 in a forward direction of the diode 8 with a magnetic energy stored in the inductance 4 as a flyback voltage. Sequentially, in the figure, when a third clock pulse rises, a voltage is applied to the gate of the FET 12 that gets in the off-state to make the FET 12 in the on-state. In this situation, the D.C. current I allows a current $i_3$, that is, a current indicated by a triangular-wave current C for exciting the inductance 3 shown in FIG. 2 to flow. At the same time, the application of a voltage to the gate of the FET 13 which is in the on-state is interrupted to make the FET 13 in the off-state. In this situation, a voltage $D_1$ shown in FIG. 3 is moved to the smoothing capacitor 14 in a forward direction of the diode 9 with a magnetic energy stored in the inductance 5 as a flyback voltage. Then, in the figure, when a fourth clock pulse rises, a voltage is applied to the gate of the FET 13 that gets in the off-state to make the FET 13 in the on-state. In this situation, the D.C. current I allows a current $i_3$, that is, a current indicated by a triangular-wave current C for exciting the inductance 5 shown in FIG. 2 to flow. At the same time, the application of a voltage to the gate of the FET 10 which is in the on-state is interrupted to make the FET 10 in the off-state. In this situation, a voltage $A_1$ shown in FIG. 3 is moved to the smoothing capacitor 14 in a forward direction of the diode 6 with a magnetic energy stored in the inductance 2 as a flyback voltage. With the above operation, one cycle is completed. That is, four clock pulses form one period, and every time one clock pulse rises, one specific FET 10, 11, 12 or 13 is sequentially made in the on-state, and when the FET 10, 11, 12 or 13 which is sequentially made in the on-state is made in the off-state once when a predetermined period (4 periods) elapses, and every time a succeeding clock pulse rises, the FET 10, 11, 12 or 13 which is made in the off-state is sequentially made in the on-state. This operation is repeated.

In this embodiment, there is applied a system in which for prevention of an over-excitation of the inductances, the on-periods of the respective FETs 10 to 13 are set as 70% at maximum, and the off-periods thereof are set as 25% at minimum to stabilize the operation, and the on-periods and off-periods of the respective FETs 10 to 13 are adjustably changed according to a fluctuation of the output voltage. That is, the respective FETs 10 to 13 are controlled by the PWM control circuit 15 so as to satisfy a relationship of output voltage $V_0=(FET_{ON}+FET_{OFF})/FET_{OFF} \times VI$. If a loss is ignored, in the case where the on-period is set as 75%, $V_0=4VI$ is satisfied. FIG. 3 shows a case in which the on-period is set as 75%. The on-periods of the respective FETs 10 to 13 are set as 75% at maximum, and the off-periods thereof are set as 20% at minimum for prevention of an over-excitation of the inductances. However, they are not limited to those numeral values.

In this embodiment, all the pulse widths of the clock pulses are set to be identical with each other. However, the pulse width may be changed for each of the clock pulses, or only the pulse width of a specific clock pulse may be changed for implementation. Also, in this embodiment, the values of the respective voltages $A_1$, $B_1$, $C_1$ and $D_1$ are identical with each other. However, the values of the respective voltages $A_1$, $B_1$, $C_1$ and $D_1$ may be entirely or partially different from each other. Further, although the prevention of gaps between the respective voltages $A_1$, $B_1$, $C_1$ and $D_1$ from occurring is ideal, such gaps may occur with the limit that no problem occurs.

Accordingly, as described above, the on-periods and the off-periods of the four FETs 10 to 13 are adjusted so that as shown in FIG. 3, the output voltage $V_0$ becomes a total of an area of the energies A, B, C and D stored in the respective inductances 2 to 5 and an area of energies $A_1$, $B_1$, $C_1$ and $D_1$ discharged by the respective inductances 2 to 5, thus being capable of always ensuring a given output voltage.

Figure 2:
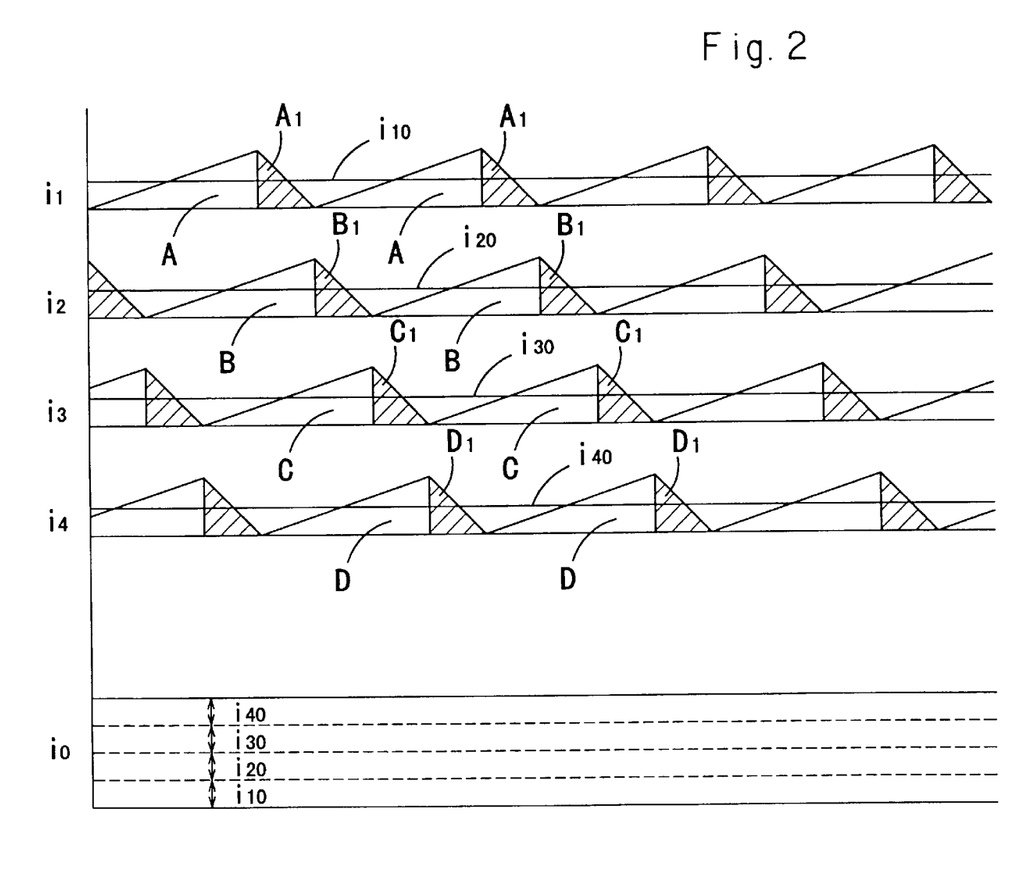
FIG. 2 is a diagram showing waveforms of currents flowing in inductances and waveforms of an input current.
Figure 3:
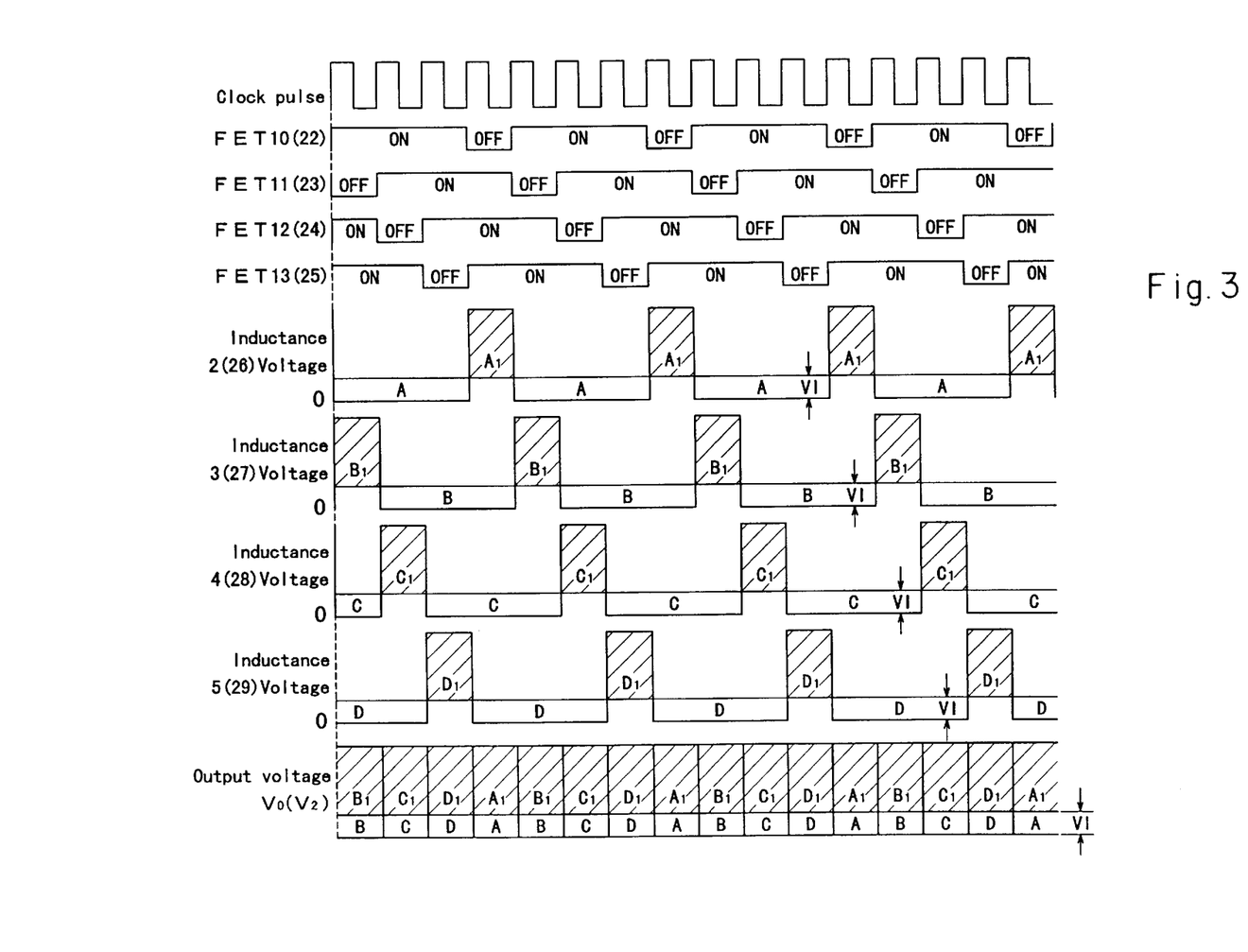
FIG. 3 is a timing chart of the switching regulator.

Then, the input current $i_0$ flowing in the D.C. power supply 1 becomes $i_0=i_1+i_2+i_3+i_4$ as shown in FIG. 2, thereby enabling a flat D.C. current without any ripple components to flow. In the figure, there are shown the mean values $i_{10}$, $i_{20}$, $i_{30}$ and $i_{40}$ of the currents $i_1$, $i_2$, $i_3$ and $i_4$ which flow in the respective inductances 2 to 5, and a total of those mean values $i_{10}$, $i_{20}$, $i_{30}$ and $i_{40}$ represent the input current $i_0$.

Figure 5:
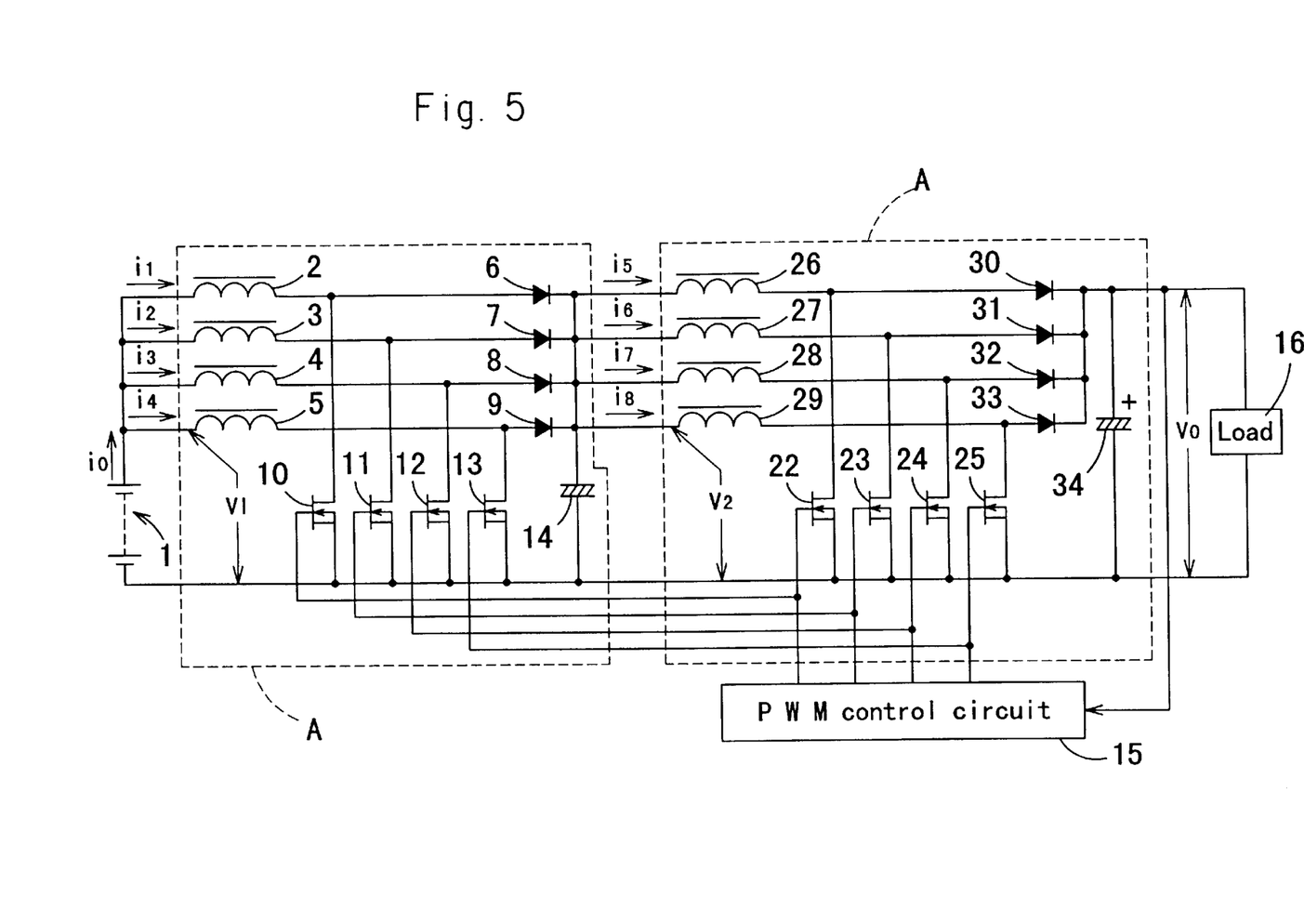
FIG. 5 is a circuit diagram showing a second specific structure of the switching regulator.

The above switching regulator may be structured as shown in FIG. 5. That is, two boost chopper circuits A are connected in series and connected to the above PWM control circuit 15 for controlling the on/off operation of all of the switching elements 10 to 13 and 22 to 25 of those boost chopper circuits A.

The boost chopper circuit A on the left side of both the boost chopper circuits A includes four inductances 2, 3, 4 and 5, four commutating diodes 6, 7, 8 and 9 which are connected to output sides of those inductances 2, 3, 4 and 5, respectively, four switching elements 10, 11, 12 and 13 for connecting the D.C. power supply 1 and nodes between the respective inductances 2 to 5 and the respective diodes 6 to 9 in a short-circuiting manner, and a smoothing capacitor 14 connected in series to an output side of those four diodes 6 to 9. The boost chopper circuit A on the right side of both the boost chopper circuits A includes four inductances 26, 27, 28 and 29, four commutating diodes 30, 31, 32 and 33 which are connected to output sides of those inductances 26, 27, 28 and 29, respectively, four switching elements 22, 23, 24 and 25 for connecting the D.C. power supply 1 and nodes between the respective inductances 26 to 29 and the respective diodes 30 to 33 in a short-circuiting manner, and a smoothing capacitor 34 connected in series to an output side of those four diodes 30 to 33.

The switching regulator structured as described above can obtain an output voltage as high as the number of inductances is more than that shown in FIG. 1. The smoothing capacitor 14 shown in the figure is provided for eliminating noises and can be omitted for implementation.

The operation of the switching regulator shown in FIG. 5 will be briefly described. Because the number of inductances is twice, for example, the output voltage $V_0$ can be always held constant by controlling the on/off operation of four pairs of inductances 2, 26, 3, 27, 4, 28, 5 and 29 according to four clock pulses as in the above manner so that in a state where a pair of inductances 2 and 26 are off according to a clock pulse signal of the specific number, other three pairs of inductances 3, 27, 4, 28, 5 and 29 are in the on-state.

Figure 6:
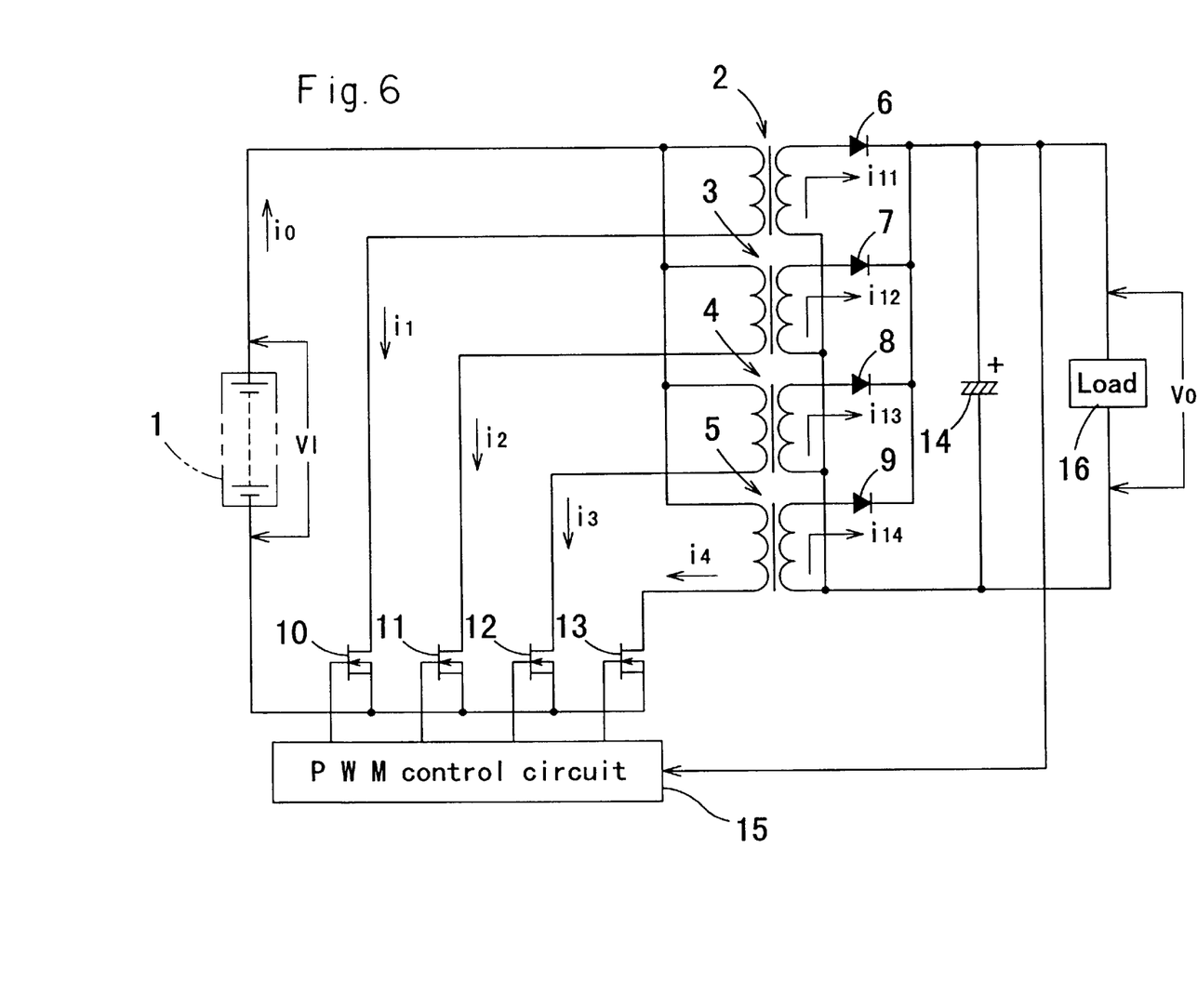
FIG. 6 is a circuit diagram showing a third specific structure of the switching regulator.

The above switching regulator may be structured as shown in FIG. 6. In other words, with the inductances 2 to 5 being made up of insulating flyback transformers each consisting of a primary winding and a secondary winding, when the number of turns of the primary winding is set to be less than the number of turns of the secondary winding, the output voltage can be allowed to rise with respect to the input voltage. On the contrary, when the number of turns of the primary winding is set to be more than the number of turns of the secondary winding, the output voltage can be allowed to drop with respect to the input voltage. In other words, if the number of turns of the primary winding and the number of turns of the secondary winding are changed, currents $i_{11}$, $i_{12}$, $i_{13}$ and $i_{14}$ flowing in the secondary inductances can be changed with respect to currents $i_1$, $i_2$, $i_3$ and $i_4$ flowing in the primary inductances so that the output voltage is allowed to rise or drop with respect to the input voltage.

According to the first aspect of the present invention, since a current flowing in the smoothing capacitor can be flattened without any ripples, the lifetime can be prevented from being shortened due to heating of the smoothing capacitor. Also, because the energies stored in a plurality of inductances are sequentially discharged, not only the output voltage can be always held constant but also the output voltage can be structured in a high output, thereby being capable of downsizing the smoothing capacitor. Moreover, even when the energy consumption of the load is large, the load can be continuously driven by adjusting the on/off period of the switching element, thereby being capable of providing a switching regulator high in reliability. A higher output can be obtained as the number of inductances increases.

According to the second aspect of the present invention, there is advantageous in that control can be digitalized by conducting PWM control using a micro-computer, and if various control is conducted by software, a high output power supply can be provided which enables digital control as a power supply for an electric automobile and a robot expected in the future.

According to the third aspect of the present invention, the output voltage can be allowed to rise and drop only by changing the number of turns of the primary winding and the number of turns of the secondary winding. A range where the circuit is useable can be expanded. In addition, a variation width of the value of the output voltage can be changed freely only by changing the number of turns of the primary winding and the number of turns of the secondary winding.

According to the fourth aspect of the present invention, when a plurality of boost chopper circuits are connected in series, a high-voltage and large-capacitance output (energy) can be obtained in comparison with a switching regulator in which a single boost chopper circuit is driven, thereby being capable of expanding a range where the output is useable. In addition, if all of the switching elements are on/off-controlled by a single control circuit, the circuit can be simplified, thereby being capable of reducing the costs.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A switching regulator, comprising:

a plurality of boost chopper circuits connected in series, each said boost chopper circuit including a plurality of inductances connected in parallel with a D.C. power supply for boosting the D.C. power supply, a plurality of commutating diodes connected to output sides of said inductances, respectively, a plurality of switching elements for connecting said D.C. power supply and a node between each of said inductances and each of said diodes in a short-circuiting manner, and a smoothing capacitor connected in series to a combined output section of said plurality of diodes;

a single control circuit for controlling the on/off operation of said plurality of all switching elements of said plurality of boost chopper circuits with a series of clock pulses, each clock pulse being associated with a specific switching element; and a load connected in parallel with said smoothing capacitor, wherein each of said switching elements is made in an on-state one after another whenever the clock pulse associated with said switching element rises, and each switching element in an on-state is turned off after a predetermined cycle, and each switching element in an off-state is made in an on-state again one after another whenever the next clock pulse associated with said switching element rises, such that at least two switching elements are always in an on-state.

2. A switching regulator as claimed in claim 1, wherein said control circuit comprises a PWM control circuit that controls the on-period of the plurality of switching elements to hold a voltage value of the load constant.

3. A switching regulator as claimed in claim 1, wherein said inductances comprise insulating flyback transformers each consisting of a primary winding and a secondary winding.

4. A switching regulator as claimed in claim 1, wherein a plurality of said boost chopper circuits are connected in series, and all of said switching elements of said boost chopper circuits are connected to said single control circuit to control the on/off operation of all of said switching elements.

5. A switching regulator as claimed in claim 1, wherein said on-state time is set at a maximum of 75% and said off-state time is set at a minimum of 25% when the number of said inductances is four.

* * * * *